(No Model.) 6 Sheets—Sheet 2.
B. BONTEMS.
APPARATUS FOR AERIAL NAVIGATION.

No. 381,106. Patented Apr. 17, 1888.

Witnesses:
John M. Speer.
A. Schehl

Inventor:
B. Bontems
by his attorneys
Miesse & Steele (No Model.) 6 Sheets—Sheet 3.
B. BONTEMS.
APPARATUS FOR AERIAL NAVIGATION.
No. 381,106. Patented Apr. 17, 1888.
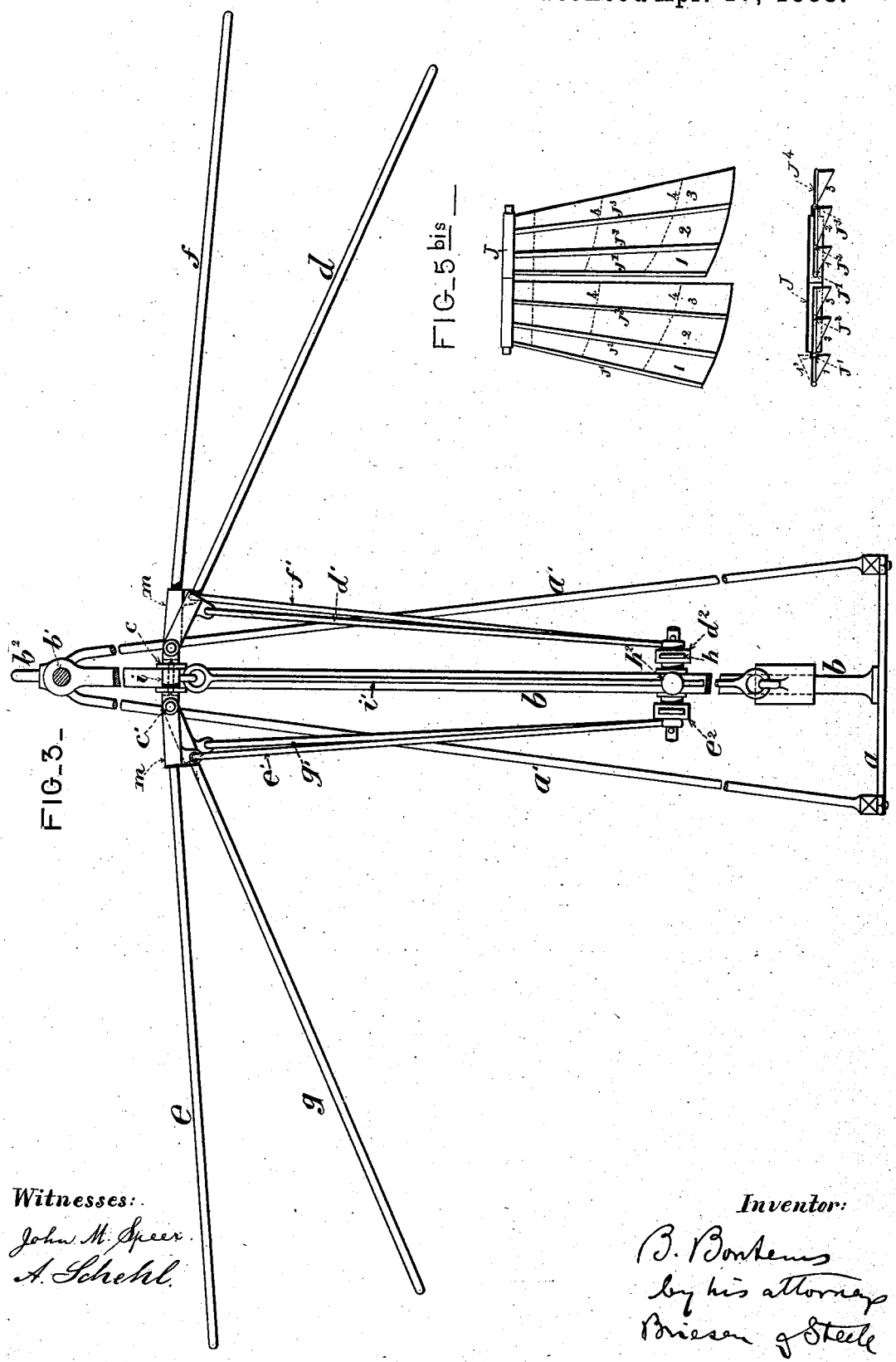
Witnesses:
John M. Speer
A. Schehl
Inventor:
B. Bontems
by his attorney
Briesen & Steele

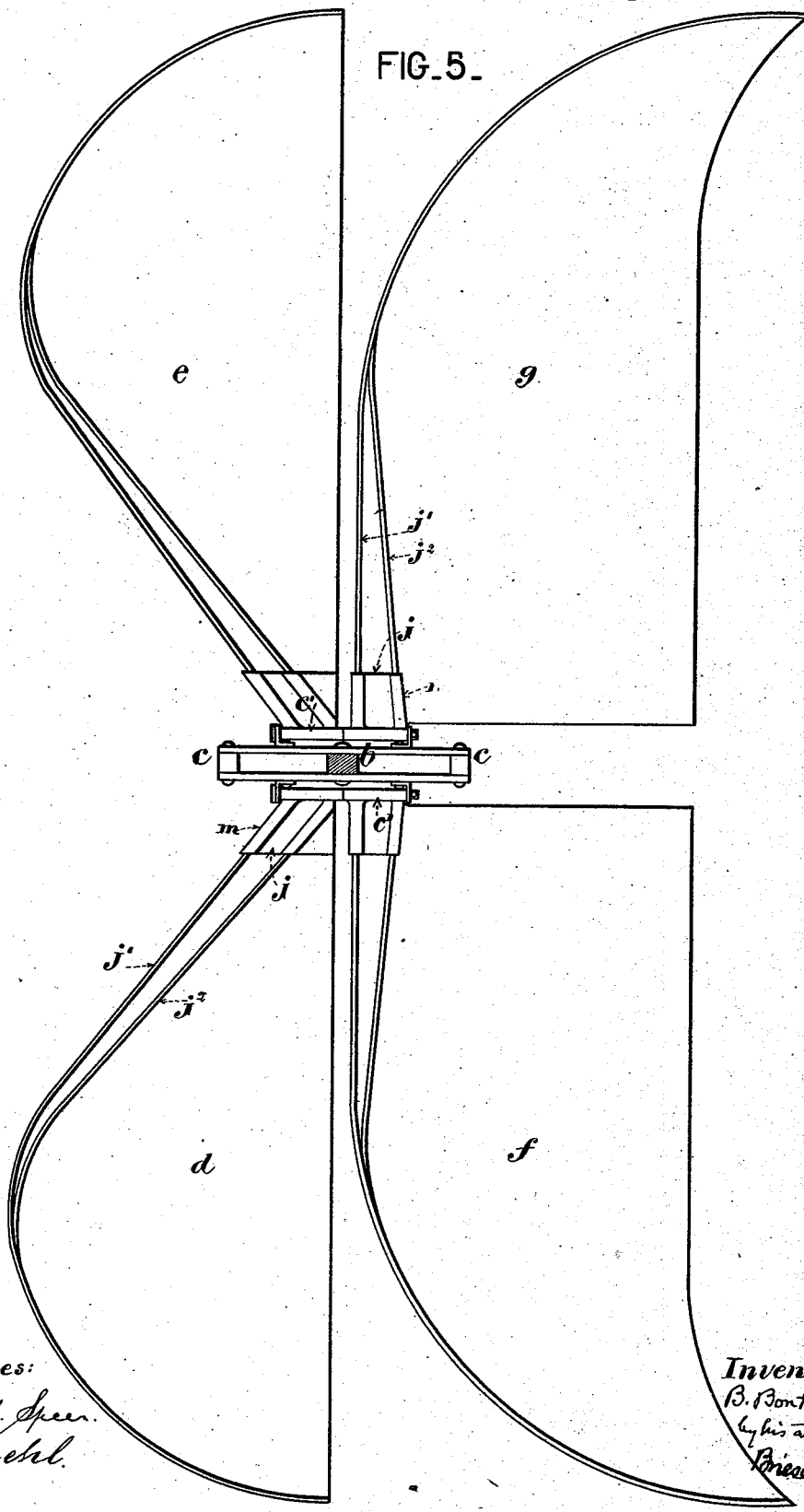

(No Model.) 6 Sheets—Sheet 5.
B. BONTEMS.
APPARATUS FOR AERIAL NAVIGATION.
No. 381,106. Patented Apr. 17, 1888.
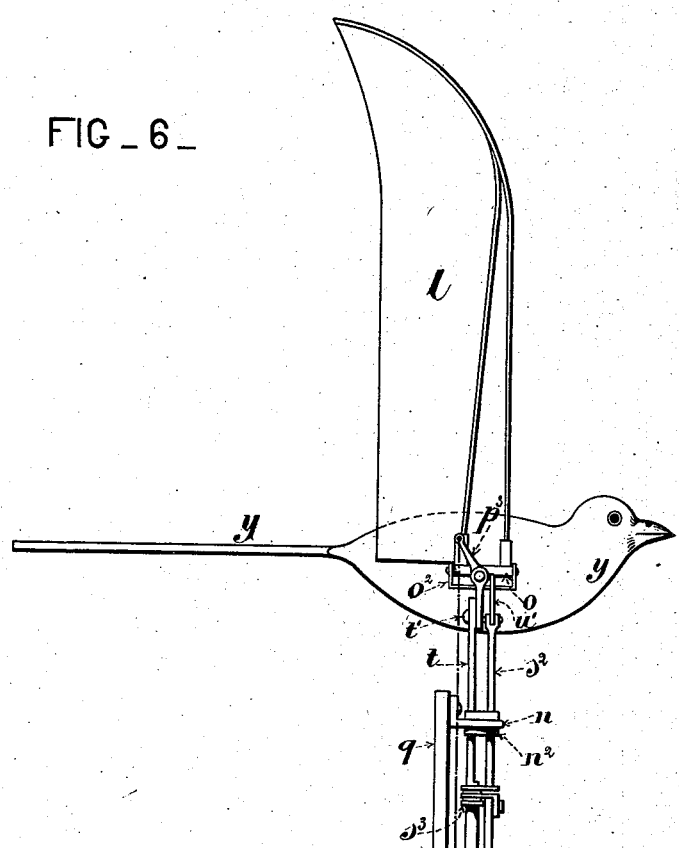
FIG_6_
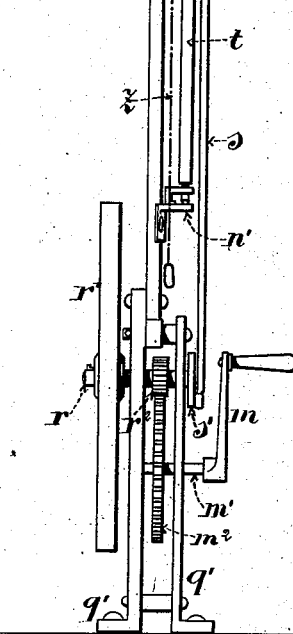
FIG_9_
Witnesses:
John M. Speer.
A. Schehl.
Inventor:
B. Bontems
by his attorney
Briesen & Steele

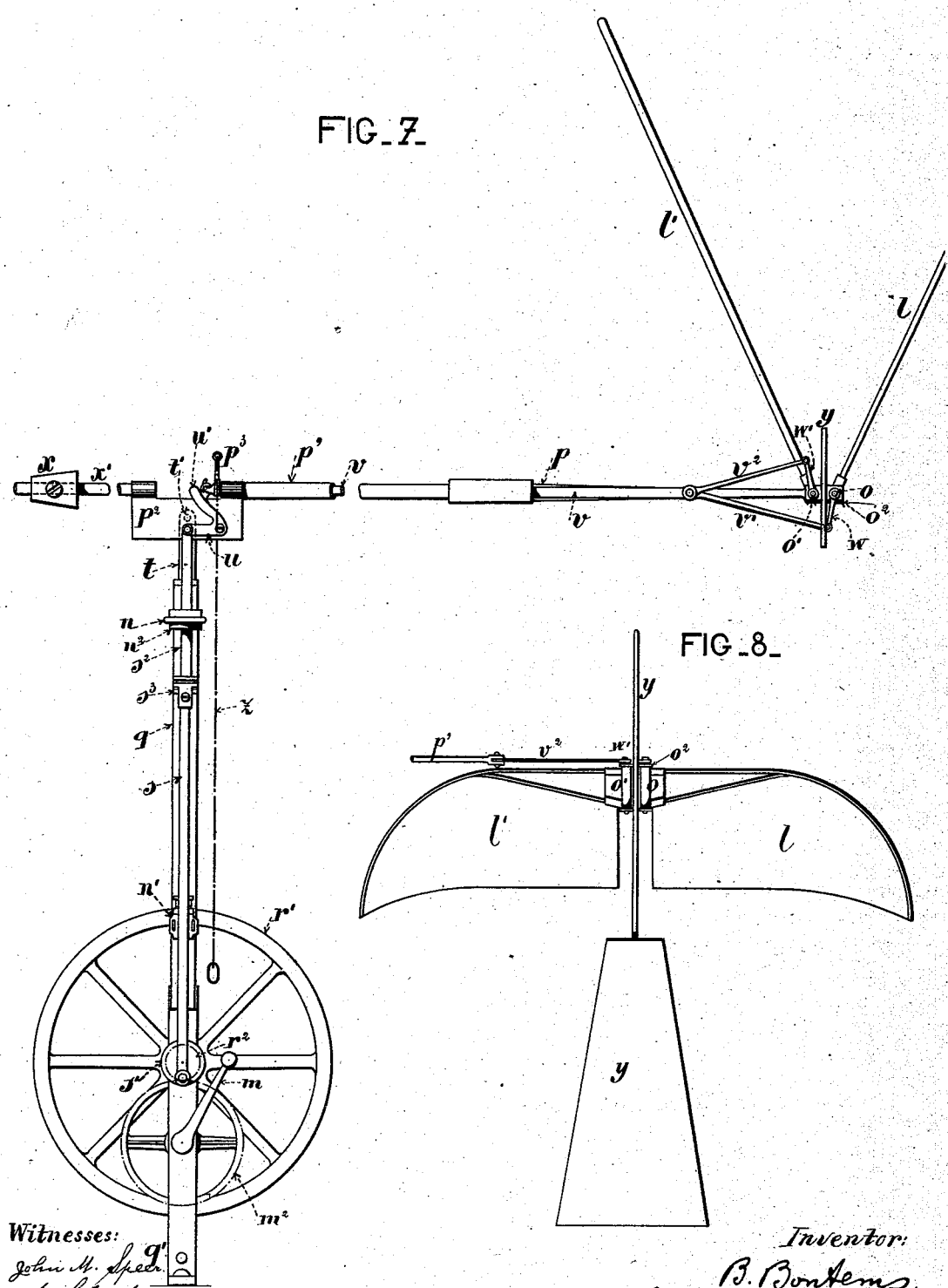

UNITED STATES PATENT OFFICE.

BLAISE BONTEMS, OF PARIS, FRANCE.

APPARATUS FOR AERIAL NAVIGATION.

SPECIFICATION forming part of Letters Patent No. 381,106, dated April 17, 1888.

Application filed May 12, 1885. Serial No. 165,195. (No model.) Patented in France April 13, 1885, No. 168,266; in Belgium April 17, 1885, No. 68,548; in England April 24, 1885, No. 5,118; in Italy April 29, 1885, XXXVI, 213, and in Germany May 4, 1885, No. 33,963.

*To all whom it may concern:*

Be it known that I, BLAISE BONTEMS, of Paris, France, have invented new and useful Improved Apparatus for Aerial Navigation, of which the following is a full, clear, and exact description, reference being had to the accompanying drawings, forming a part hereof, and for which I have obtained the following Letters Patent in foreign countries, viz: France, No. 168,266, April 13, 1885; Belgium, No. 68,548, April 17, 1885; Germany, No. 33,963, May 4, 1885; England, No. 5,118, April 24, 1885; Italy, No. 213, Vol. 36, April 29, 1885.

Figure 1:
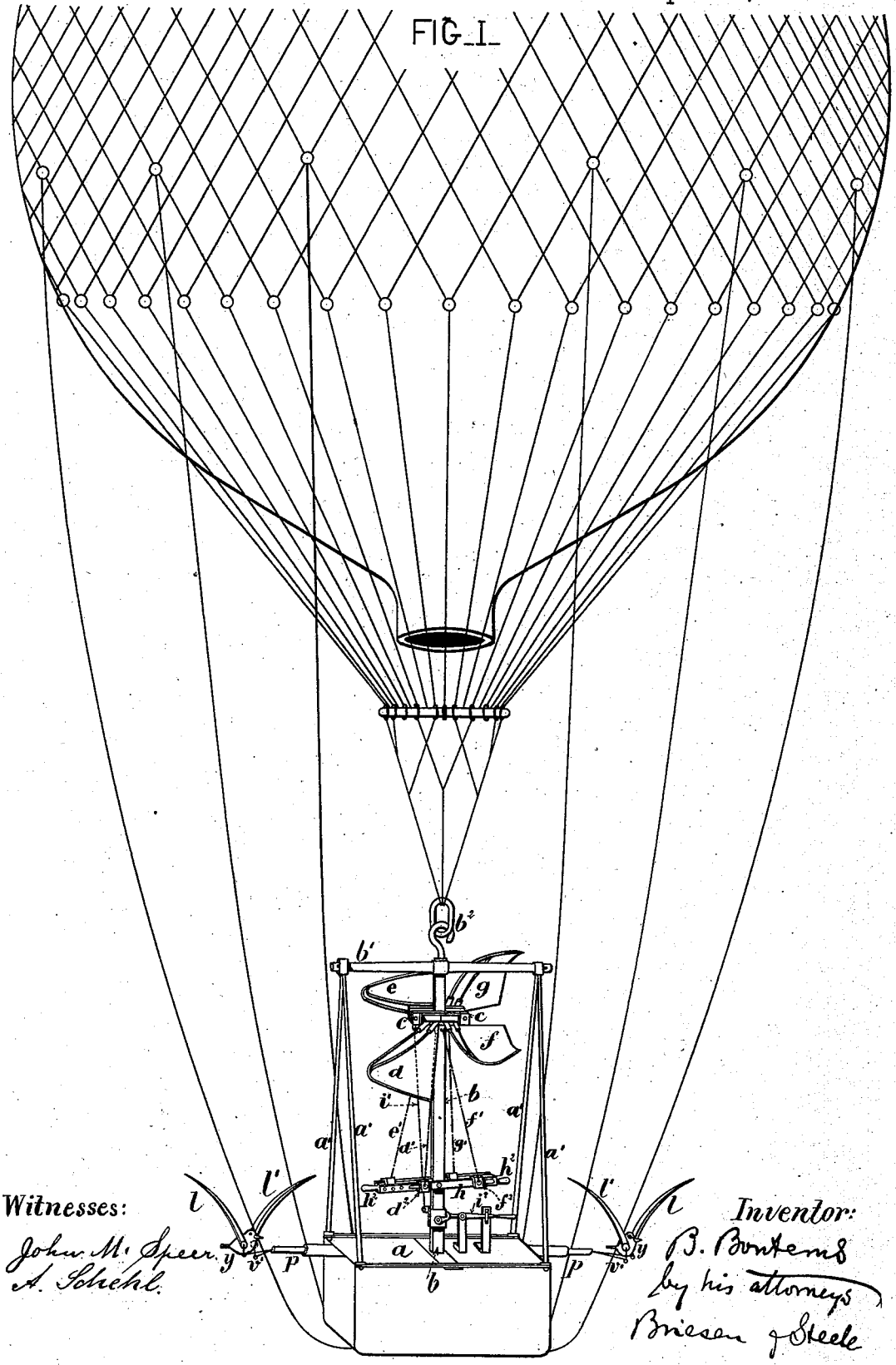
Figure 2:
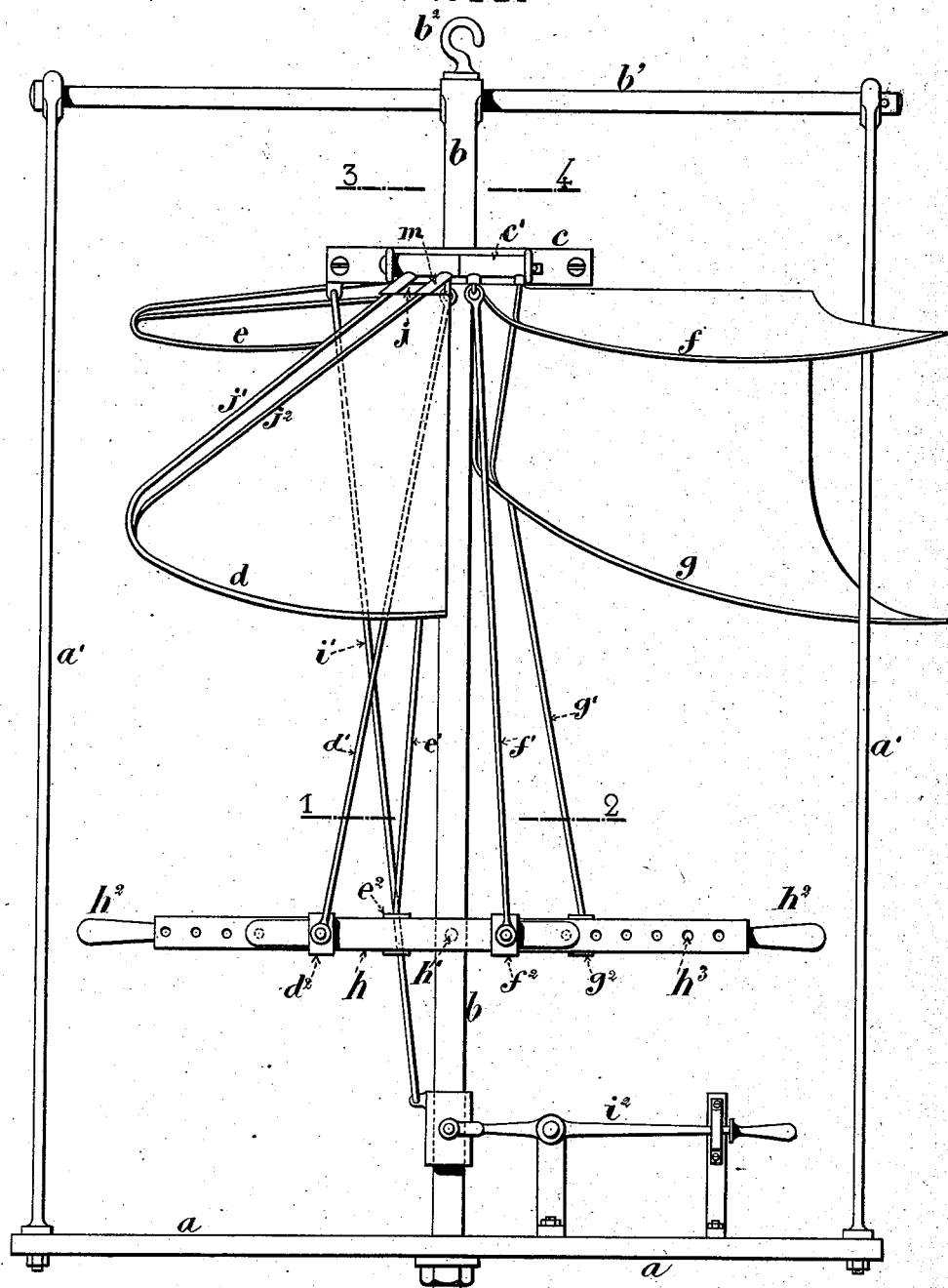
Figure 4:
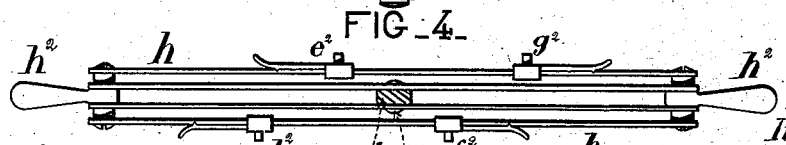

In the accompanying drawings, Figure 1 represents a side view of the apparatus as applied to a balloon. Fig. 2 is an enlarged face view of the apparatus; Fig. 3, a side view of the same. Fig. 4 is a horizontal section taken at the line 1 2 of Fig. 2. Fig. 5 is a horizontal section on the line 3 4, Fig. 2. Fig. $5^{bis}$ is a diagram showing a modified construction of wing. Figs. 6 and 7 represent an elevation and side view of mechanism for co-operating with that shown in Figs. 1, 2, 3, and 4. Fig. 8 is a plan view of this supplementary mechanism. Fig. 9 is a detail horizontal section through the rod or shaft $t$.

Nature in the form of a bird presenting the best model to follow in the construction of machines for aerial navigation, I have closely followed the movements of the bird in its flight as being the best means of solving the difficult problem of how to direct a machine through the air in any desired direction. This is effected by the mechanical means hereinafter described.

$a$ is a platform to which the car is to be attached.

$b$ is a post rising from the platform $a$ and carrying at its upper end a cross-bar, $b'$, the ends of which connect by cords or braces $a'$ with the ends of the platform $a$. A hook or ring, $b^2$, on the post $b$ serves to connect the same with the balloon, as shown in Fig. 1. Below the cross-bar $b'$ is mounted on the post $b$ a frame, $c$, carrying two horizontal arbors, $c'$ $c'$, on opposite sides of the post $b$, as shown in Fig. 1. To one of these arbors are secured two wings, $e$ $g$, and to the other are in like manner secured two wings, $d$ $f$. Each of these wings has a crank, $m$, and is connected by one of four rods, $d'$ $e'$ $f'$ $g'$, to a working-lever, $h$, which is pivoted at $h'$ to the post $b$. At its ends the lever $h$ has suitable handles, $h^2$. The rods $d'$ $e'$ $f'$ $g'$ are pivoted to clasps $d^2$ $e^2$ $f^2$ $g^2$, Fig. 4, which can be slid along the lever $h$ to increase or reduce the purchase of said lever respecting any one or more of said wings $d$ $e$ $f$ $g$. In fact, the motion of any one or more of said wings can be arrested by drawing its clasp close to the post $b$.

The clasps $d^2$ $e^2$ $f^2$ $g^2$ can be moved individually or collectively, so that any one of the wings can be moved separately or all together, equally or unequally, as may be required. Holes $h^3$ in the face of the lever $h$ serve to hold the clasps in the requisite positions, the clasps having suitable spring-latches which lock into these holes or into equivalent notches.

The upper frame, $c$, bearing the wings, is pivoted to the post $b$, and is held in a horizontal or more or less inclined position by a rod, $i'$, and lever $i^2$, both of which are joined to a sliding sleeve on the post $b$, as shown in Fig. 2. The wings $d$ $e$ $f$ $g$ (see Fig. 5) are mounted on ribs $j'$ $j^2$, of bamboo or other material, which rods enter sockets that project from the arbors $c'$. The body of these wings is made of silk, cotton, paper, or other matter. Fig. $5^{bis}$ represents another form of wing divided into several sections by ribs of bamboo, $J'$ $J^2$ $J^3$, which ribs are connected to metal frame-work. The spaces between the ribs are filled with pieces, 1 2 3, of silk or the like.

In the above description the wings $d$ $e$ are supposed to be in front and the wings $f$ $g$ in rear. When the wings $d$ $e$ are moved by the lever $h$, they will force the air rearward. The wings $f$ and $g$ act in the same manner. The result produced is also affected by the position in which the frame $c$ is placed. For instance, when this frame is horizontal the flight is horizontal; if it is sloped downward or upward the motion of the apparatus will be changed to correspond.

When it is desired to take a right or left course, the appropriate wing is made stationary.

The mechanism shown in Figs. 6, 7, 8, and 9 is to co-operate with that already described, and is shown in connection therewith in Fig. 1. Two wings, $l\,l'$, are secured to the arbors $o\,o'$, which project from a tube, $o^2$, that is carried on the end of a tube, $p$. The tube $p$ passes through another tube, $p'$, which is attached to a block, $p^2$, that is pivoted by a pin, $t'$, to a vertical rod, $t$. The rod $t$ is a swivel-rod, being guided above in a ring, $n$, that is fixed to a frame, $q$, while its lower end rests on a step or bearing, $n'$, that is attached to the same frame $q$. This frame $q$, which is of suitable dimensions, is secured to the bottom of the car, or in any other proper position. Its lower part has two plates, $q'\,q'$, which support the shafts $m'$ and $r$, that carry, respectively, a crank, $m$, and a fly-wheel, $r'$, and are geared together by the toothed wheel $m^2$ and pinion $r^2$. The shaft $r$ also carries a crank, $s'$, which connects by a jointed rod, $s\,s^2$, with a bell-crank, $u\,u'$, that is pivoted to the block $p^2$. The upper arm, $u'$, of the bell-crank $u\,u'$ governs a long shaft, $v$, which passes through the tube $p$ and is pivoted at the outer end to two small shafts, $v'\,v^2$, which are respectively united to the cranks $w\,w'$, that project from the pivots of the wings $l\,l'$. The continuous rotary motion of the crank $m$ is transformed into up and down movements of the shaft $s$, and these into rectilinear reciprocating movements of the shaft $v$, which produce by the connections $v'\,v^2$ symmetrical beatings of the wings $l\,l'$. All the parts $p\,p'$ and the mechanism of the wings $l\,l'$ are equipoised by means of a counter-weight, $x$, sliding at will on an arm, $x'$, that projects from the block $p^2$. Finally, the wings $l\,l'$ are provided with a rudder, $y$, which may be of the form of a bird, and which can be turned by turning its supporting-tube $p$ in any direction in the outer tube, $p'$, under the action of a cord or rod, $z$, connected to a crank, $p^3$, of the said tube $p$. Thus the flight of the mechanical bird $l\,l'\,y$ can be directed either for ascending or descending.

In placing one or more of these devices on the car of a balloon (see Fig. 1) the same can be used to co-operate with the other mechanism, either for hovering in the air, rising or descending, or moving to the right or left.

The two devices hereinabove specified can be employed conjointly or separately for aerial navigation with or without a balloon. They can be applied to toys or apparatus used in teaching aërostatics, or for ventilation of buildings, &c.

Having thus described my invention, what I claim is—

1. The combination of the upright post $b$ with the frame $c$, carrying pivoted wings $d\,e\,f\,g$, and with the lever $h$ on the post $b$, rods $d'\,e'\,f'\,g'$, and clasps $d^2\,e^2\,f^2\,g^2$, the said clasps and rods serving to connect the lever $h$ with the pivoted wings, respectively, substantially as herein shown and described.

2. The combination of the rudder $y$ with the horizontal tube $p$, wings $l\,l'$, tube $o^2$, crank-arbors $o\,o'$, and with mechanism, substantially as described, for oscillating said crank-arbors and said tube $p$, the wings $l\,l'$ being secured to the crank-arbors $o\,o'$, which project from the tube $o^2$, that is carried by the tube $p$, said tube $p$ also carrying the rudder, as specified.

BLAISE BONTEMS.

Witnesses:
ALPHONSE BLÉTRY,
ROBT. M. HOOPER.